United States Patent [19]

Van Der Meer

[11] Patent Number: 5,699,476
[45] Date of Patent: Dec. 16, 1997

[54] METHOD AND APPARATUS FOR TRANSMITTING AND/OR STORING A SERIES OF HIERARCHICALLY ENCODED DIGITAL IMAGE DATA BLOCKS

[75] Inventor: Jan Van Der Meer, Eindhoven, Netherlands

[73] Assignee: U.S. Philips Corporation, New York, N.Y.

[21] Appl. No.: 647,149

[22] Filed: May 9, 1996

Related U.S. Application Data

[63] Continuation of Ser. No. 369,864, Jan. 5, 1995, abandoned, which is a continuation of Ser. No. 111,037, Aug. 24, 1993, abandoned, which is a continuation of Ser. No. 600,452, Oct. 19, 1990, abandoned.

[30] Foreign Application Priority Data

Feb. 22, 1990 [NL] Netherlands .............. 9000424

[51] Int. Cl.$^6$ .............................................. H04N 5/92
[52] U.S. Cl. ........................... 386/111; 386/125; 386/124
[58] Field of Search ............................. 386/46, 68, 109, 386/111, 112, 123, 124, 125; 348/399, 419, 407, 406, 408, 415; H04N 5/92

[56] References Cited

U.S. PATENT DOCUMENTS

| | | | |
|---|---|---|---|
| 4,646,166 | 2/1987 | Arlan | 358/310 |
| 4,660,096 | 4/1987 | Arlan et al. | 358/335 |
| 4,807,053 | 2/1989 | Heijnemans | 358/335 |
| 4,849,810 | 7/1989 | Ericsson | 348/416 |
| 4,858,032 | 8/1989 | Okada et al. | 358/310 |
| 4,914,508 | 4/1990 | Music et al. | 358/135 |
| 4,914,515 | 4/1990 | Van Luyt | 358/141 |
| 4,931,879 | 6/1990 | Koga et al. | 358/335 |
| 4,935,813 | 6/1990 | Fonsalas et al. | 348/324 |
| 4,939,586 | 7/1990 | Nabati et al. | 358/310 |
| 4,942,476 | 7/1990 | Koga et al. | 358/335 |
| 4,969,204 | 11/1990 | Melnychuck et al. | 348/408 |
| 4,977,453 | 12/1990 | Fonsalas et al. | 348/324 |
| 4,985,784 | 1/1991 | Tsuboi et al. | 358/342 |
| 5,032,927 | 7/1991 | Watanabe et al. | 358/335 |
| 5,036,391 | 7/1991 | Auvray et al. | 358/133 |
| 5,047,852 | 9/1991 | Hanyu et al. | 358/141 |
| 5,047,865 | 9/1991 | Inoue | 358/310 |
| 5,050,230 | 9/1991 | Jones et al. | 348/408 |
| 5,068,744 | 11/1991 | Ito | 358/310 |
| 5,136,391 | 8/1992 | Minami | 358/310 |

FOREIGN PATENT DOCUMENTS 0340843  11/1989  European Pat. Off. .

Primary Examiner—Thai Tran
Assistant Examiner—Huy Nguyen
Attorney, Agent, or Firm—Michael E. Marion

[57] ABSTRACT

A system for transmitting a series of images of a full motion video scene in a digital format whereby the series of images is divided into a number of sub-series which, when interleaved, represent the original series. A ranking order of increasing magnitude is allocated to consecutive sub-series. Each image of a sub-series is converted into an image data block, while images from one or more sub-series having a lower order of precedence are considered for this conversion. A packet header indicating the ranking order of the sub-series with which the corresponding image is associated is added to each image data block. A display apparatus is adapted to select those image data blocks which have predetermined packet headers and to subject the image data blocks thus selected to a decoding process. The number of different packet headers which is selected determines the temporal resolution of the scene to be displayed.

9 Claims, 5 Drawing Sheets

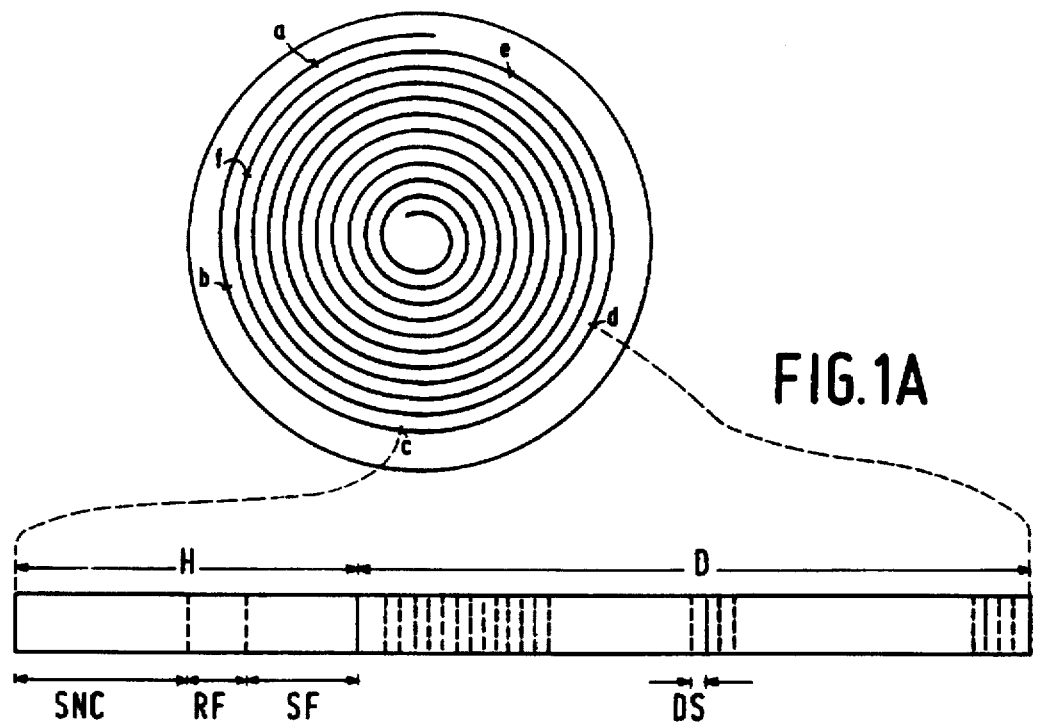
FIG.1A
FIG.1B
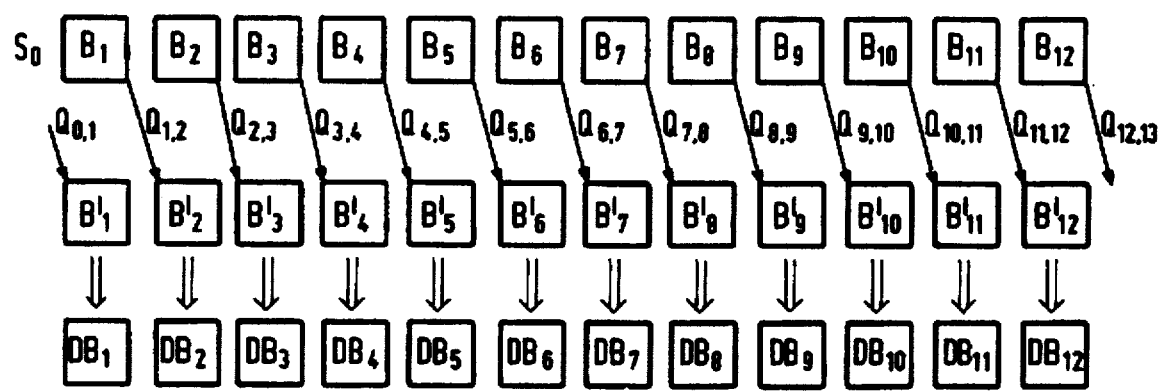
FIG.2

METHOD AND APPARATUS FOR TRANSMITTING AND/OR STORING A SERIES OF HIERARCHICALLY ENCODED DIGITAL IMAGE DATA BLOCKS

This is a continuation of application Ser. No. 08/369,864, filed Jan. 5, 1995, abandoned, which was a continuation of application Ser. No. 08/111,037, filed Aug. 24, 1993, abandoned which was a continuation of application Ser. No. 07/600,452, filed on Oct. 19, 1990, abandoned.

A. BACKGROUND OF THE INVENTION

A(1) Field of the invention

The invention generally relates to a method of transmitting a series of images of a full motion video scene in a digital format via some transmission medium. More particularly, said transmission medium is constituted by a compact disc-like record carrier.

The invention also relates to a display apparatus in which the transmitted images are processed and made suitable for display on a display screen; and to an optically readable record carrier on which said images are stored.

A(2) Description of the Prior Art

More than fifteen years ago the firm of Philips marketed an optically readable record carrier on which audio signals as well as analog video signals were recorded. This record carrier was referred to as video long play (VLP) and supplemented the well-known audio long play (ALP). As compared with videotapes, such optically readable record carriers have the advantage that their quality does not deteriorate due to repeated use. However, as compared with video tapes they have the drawback that they cannot be rerecorded.

In the last ten years a completely new trend has developed, namely that of the optically readable audio record carriers generally known by the name of CD audio (Compact Disc audio). Due to its general acceptance and the ever increasing demand for integration of audio and video apparatus, a compact disc video has been created on which digitized audio signals as well as an analog video signal are present, which video signal corresponds to a full motion video scene having a duration of several minutes.

To increase this duration, the original analog video signal has been digitized. A full motion video scene is then considered as a finite series of images, for example, fifty or sixty occurring each second. Such an image comprises, for example 288 image lines with 352 pixels per line. By means of some sensibly chosen encoding algorithm each image is converted into an image data block comprising enough digital information so that each pixel of the image can be reconstructed, with the possible inclusion of the information from other image data blocks. The encoding algorithm is chosen to be such that consecutive image data blocks comprise a minimum amount of redundant information. Since the length of each image data block (number of bits in this image data block) is thus very limited, a very large number of such image data blocks can be recorded on such a record carrier.

B. OBJECT AND SUMMARY OF THE INVENTION

The invention has for its object to contribute to the above-mentioned novel development in order to render said display apparatus financially accessible to a very wide public on the consumer market.

According to the invention the images of the series are subjected to a hierarchic encoding process in which the original series of images is considered as a number of interleaved sub-series having an increasing ranking order and in which images from sub-series having a lower ranking order are considered for encoding an image of a sub-series. In this way each image is converted into an image data block and a packet header indicating the ranking order of the sub-series with which the corresponding image is associated, is added to each image data block.

The display apparatus is now adapted to receive all these image data blocks but to select only those blocks which have predetermined packet headers. Only image data blocks which are thus selected are subjected to a hierarchic decoding process in a video processing circuit so as to generate signals which are suitable for displaying the image on a display screen (for example, a display tube).

The invention will certainly be appreciated if the following aspect is considered. The costprice of a video processing circuit increases exponentially with the number of operations (additions, subtractions, etc.) which it can perform each second. If the rate of the images in the original series is equal to 50 Hz, this means that the video processing circuit must be capable of determining each second the three chrominance signals R, G and B from the transmitted information for approximately $5.10^6$ pixels. The number of operations which must thus be performed is so high that this can only be realized by means of a very "powerful" video processing circuit which is, however, so costly that display apparatus is financially accessible to a select group of consumers only.

According to the invention the display apparatus can make a selection from the presented image data packets so that only image data packets having predetermined packet headers are applied to the video processing circuit for further processing. This means that the video processing circuit only has to process a part of all available image data packets, for example, no more than half of them. It is true that this is at the expense of the image quality, but practice has proved that this quality is maintained at a sufficiently high level. It also means that the video processing circuit may be considerably less powerful, which renders its costprice and hence that of the display apparatus very favorable.

C. BRIEF DESCRIPTION OF THE FIGURES

FIGS. 1A and 1B shows diagrammatically a compact disc-like record carrier having a track and its division into packets;

FIGS. 2 to 7 show some diagrams to explain the hierarchic encoding process;

D. EXPLANATION OF THE INVENTION

Figure 3:
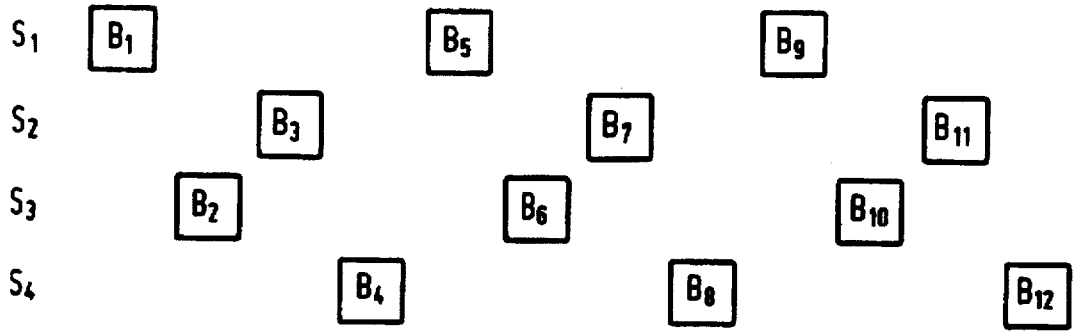

In FIG. 1A a part of the track on a compact disc-like record carrier is shown diagrammatically. A packet is present between each two consecutive points a, b, c, d, e, etc. The structure of such a packet is shown diagrammatically in FIG. 1B. It comprises, for example 2352 bytes and is divided into a packet header H comprising 24 bytes and a data field D comprising 2328 bytes.

The packet header H is further divided into a synchronization field SNC of 12 bytes, an ordinal number field RF of four bytes and a service field SF of eight bytes. The synchronization field SNC marks the start of a packet. It comprises one byte consisting exclusively of "0" bits, followed by 10 bytes consisting exclusively of "1" bits and finally again one byte consisting exclusively of "0" bits. The bytes in the ordinal number field RF indicate the ordinal number of the packet in the track. The service field SF indicates whether the packet is a video packet, an audio packet or a computer data packet.

The data field D is divided into data slots DS. The data slots of an audio packet are chosen to be such that a 16-bit audio word of a digital audio signal can be transmitted in each slot. The data slots of a video packet are chosen to be such that an 8-bit video word of a digitized video signal can be incorporated in each slot. These data slots also have a length of one byte for computer data packets.

As already stated in the foregoing, each image is considered as a matrix of 288*352 pixels P(i,k). In this case $i(=1, 2, 3, \ldots 288)$ is the ordinal number of the row and $k (=1, 2, \ldots 352)$ is the ordinal number of the pixel on this row (column). The color of such a pixel is completely determined by an associated luminance vahe $Y(i,k)$ and two color difference values $U(i,k)$ and $V(i,k)$. If these three values of each pixel were encoded with an eight-bit accuracy, approximately 130 video packets would be required for one image. However, this number can be reduced to 54 video packets without any deterioration of the image quality, namely by transmitting only one out of four color difference signals in one out of two image lines. In this case an image is thus completely defined by a 288*352 luminance matrix $Y(i,k)$, a 144*88 color difference matrix $U(r,s)$ and a 144*88 color difference matrix $V(r,s)$, $r=1, 2, \ldots 144$ and $s=1, 2, \ldots 88$.

There are many encoding methods of further reducing the number of bits required to represent an image and hence the number of video packets required for each image. By way of example one such method will now be described in greater detail with reference to FIG. 2. In this FIG. 2 the reference $S_O$ denotes a series of consecutive images $B_1, B_2, \ldots B_{12}$ of a full motion scene. The luminance matrix associated with the image $B_n$ ($n=1, 2, \ldots$) will be denoted by $Y_n(i,k)$ and the color difference matrices will be denoted by $U_n(r,s)$ and $V_n(r,s)$, respectively. For each image $B_n$ a prediction image $B_n'$ is determined, comprising the prediction matrices $Y_n'(i,k)$, $U_n'(r,s)$ and $V_n'(r,s)$ and, starting from these matrices a difference image $DB_n$ comprising the difference matrices $DY_n(i,k)$, $DU_n(r,s)$ and $DV_n(r,s)$ by difference formation of the image $B_n$ and the prediction image $B_n'$, or expressed mathematically:

$$DB_n = B_n - B_n'$$

i.e.

$$DY_n(i,k) = Y_n(i,k) - Y_n'(i,k)$$
$$DU_n(r,s) = U_n(r,s) - U_n'(r,s)$$
$$DV_n(r,s) = V_n(r,s) - V_n'(r,s)$$

The prediction image $B_n'$ is obtained by determining a system of motion vectors $Q_{n-1,n}$ for the previous image $B_{n-1}$ and by shifting the individual pixels of this image $B_{n-1}$ in accordance with the associated motion vectors.

Since the dynamic range of the luminance and color difference values of the difference matrices is considerably smaller than that of the original matrices, these values can be represented with considerably fewer bits, for example with only four bits instead of the original eight bits. Although the calculated systems of motion vectors $Q_n$ must be transmitted in addition to the difference images $DB_n$ for an accurate reconstruction of the original images in the display apparatus, this method results in a considerable saving of bits. On the one hand a larger number of images can thus be recorded on the record carrier and on the other hand the time required to read all information for an image from the record carrier is considerably shorter.

In this known encoding method each difference image is dependent on the previous image. In the display apparatus each image of the series will therefore have to be reconstructed. This means that the temporal resolution of the scenes to be displayed by the display apparatus is equal to the temporal resolution of the scenes which have been picked up. As already noted, this means that the display apparatus should comprise a very powerful video processing circuit.

The temporal resolution can be influenced and hence the requirements which must be imposed on the video processing circuit can be influenced by subjecting the images of the series to a hierarchic encoding process as extensively described, for example in European Patent Application no. 0,340,843. For the sake of completeness this method will be described in greater detail by way of example with reference to FIG. 3. In this FIG. 3 the series of consecutive images $B_1, B_2, \ldots B_{12}$ of a full motion scene is again shown at $S_O$. This series is divided into a number of sub-series, of images four in this case, denoted by $S_1$, $S_2$, $S_3$ and $S_4$, respectively. Sub-series $S_1$ comprises the images $B_1, B_5, B_9, \ldots$, sub-series $S_2$ comprises the images $B_3, B_7, B_{11}, \ldots$, sub-series $S_3$ comprises the images $B_2, B_6, B_{10}, \ldots$, and sub-series $S_4$ comprises the images $B_4, B_8, B_{12}, \ldots$. The images of sub-series $S_1$ are converted into difference images $DB_1, DB_5, DB_9, \ldots$ in the way as described above with reference to FIG. 2. As is shown in FIG. 4 for the sake of completeness, a system of motion vectors is more particularly determined for each image of this sub-series $S_1$. The system $Q_{1,5}$ for the image $B_1$, the system $Q_{5,9}$ for the image $B_5$, the system $Q_{9,13}$ for the image $B_9$ and so forth. With the aid of these vectors prediction images $B_1', B_5', B_9', \ldots$ are calculated and the difference image $DB_m$ is obtained from a series $DS_1$ by difference formation of the original image $B_m$ ($m=1, 5, 9, 13, \ldots$) and the associated prediction image $B_m'$.

Figure 5:
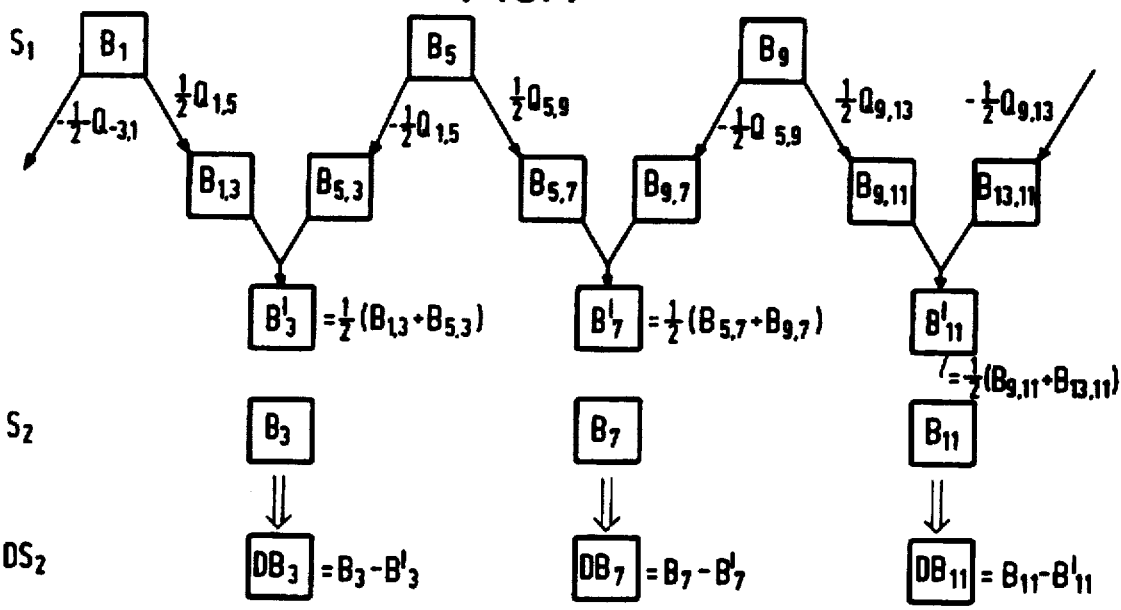

As already noted, a vector of, for example, the system $Q_{1,5}$ denotes the direction and the distance over which a pixel or a group of pixels of the image $B_1$ must be displaced so as to reach the position of this pixel or group of pixels in the image $B_5$. For encoding the images in the sub-series $S_2$, $S_3$ and $S_4$ it is assumed for the sake of simplicity that such a displacement is linear. This means that said pixel of $B_1$ has undergone a quarter of the total displacement for the image $B_2$, half the total displacement for the image $B_3$ and three quarters of the total displacement for the image $B_4$. For encoding the images of the sub-series $S_2$ one proceeds in the manner as shown in FIG. 5. Starting from the image $B_1$ and a system of motion vectors $\frac{1}{2}Q_{1,5}$ each having the same direction as the motion vectors in the system $Q_{1,5}$, but being only half as long, a prediction image $B_{1,3}$ is determined. Starting from the image $B_5$ and a system of motion vectors $-\frac{1}{2}Q_{1,5}$ each having a direction which is opposite to the direction of the motion vectors in the system $Q_{1,5}$ and being only half as long, a prediction image $B_{5,3}$ is determined. The average value of the two prediction images $B_{1,3}$ and $B_{5,3}$ is taken by adding the two prediction images together and dividing them by two. The result is the desired prediction image $B_3'$. By difference formation with the original image $B_3$, the difference image $DB_3$ of a series $DS_2$ is obtained.

Figure 6:
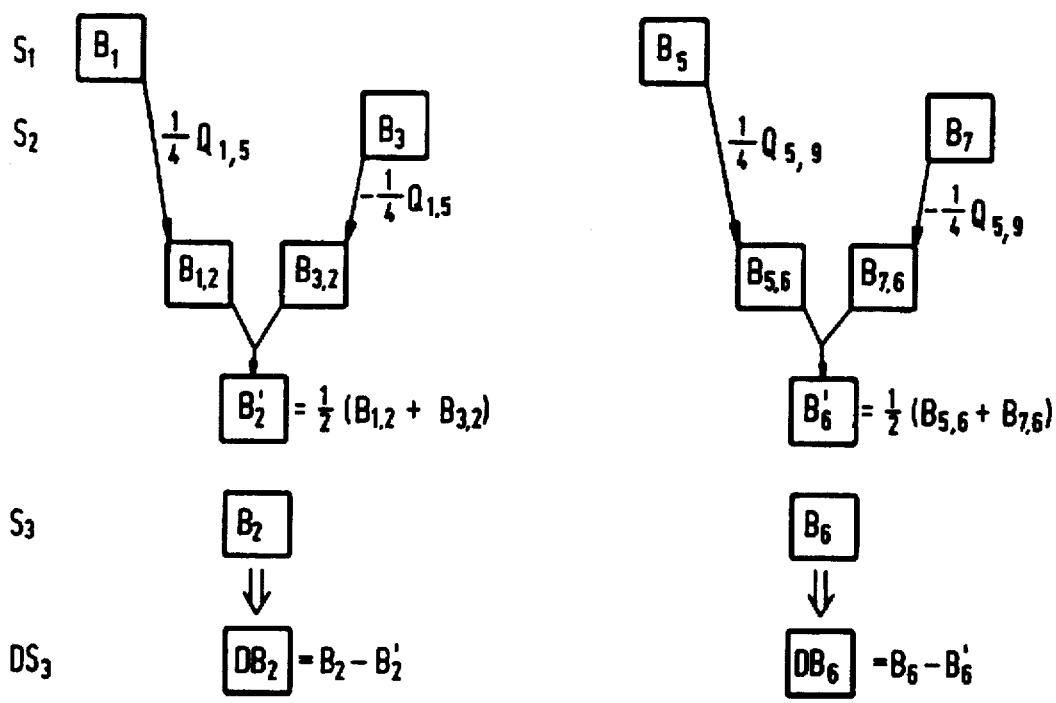
Figure 7:
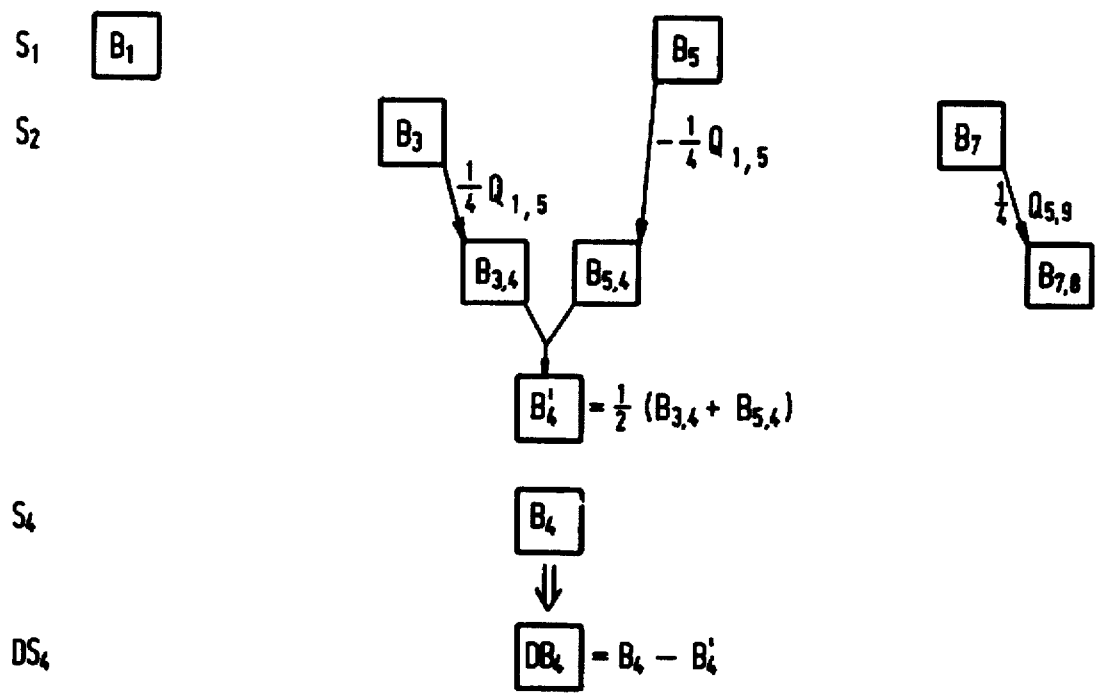

As is shown in FIG. 6, a prediction image $B_2'$ is determined in a corresponding manner, starting from the images $B_1$ and $B_3$, which prediction image leads to a difference image $DB_2$ of a series $DS_3$ by difference formation with $B_2$. Finally FIG. 7 shows how a difference image $DB_4$ of a series $DS_4$ is obtained by starting from the images $B_3$, $B_4$ and $B_5$.

For transmitting the series of sub-images difference images thus obtained, the information for each sub-image difference images is serialised so that an image data block for each sub-image difference images is obtained. The image data block associated with the difference image $DB_n$ will be denoted by $DB_n{}'$. The image data blocks thus obtained are subsequently transmitted (i.e. recorded on the disc) in the sequence as shown, for example in FIG. 8. More particularly, an image data block (for example $DB_5{}'$) associated with a difference image from series $DS_1$ is transmitted first, then the image data block ($DB_3{}'$) of the immediately preceding difference image associated with series $DS_2$, subsequently the image data block ($DB_2{}'$) of the immediately preceding difference image associated with series $DS_3$ and finally the image data block ($DS_4{}'$) of the immediately preceding difference image associated with series $DS_4$. It is to be noted that $B_1$ in FIG. 8 is assumed to be the first image of the scene.

To be able to distinguish the image data blocks of the difference images of series $DS_i$ (i=1, 2, 3, 4) from those of the difference images of series $DS_j$ (j=1, 2, 3, 4,) and j≠i, a packet header indicating the series with which a corresponding difference image is associated is added to each image data block. In FIG. 8 these packet headers are denoted by $DS_1$, $DS_2$, $DS_3$ and $DS_4$.

Figures 8, 9:
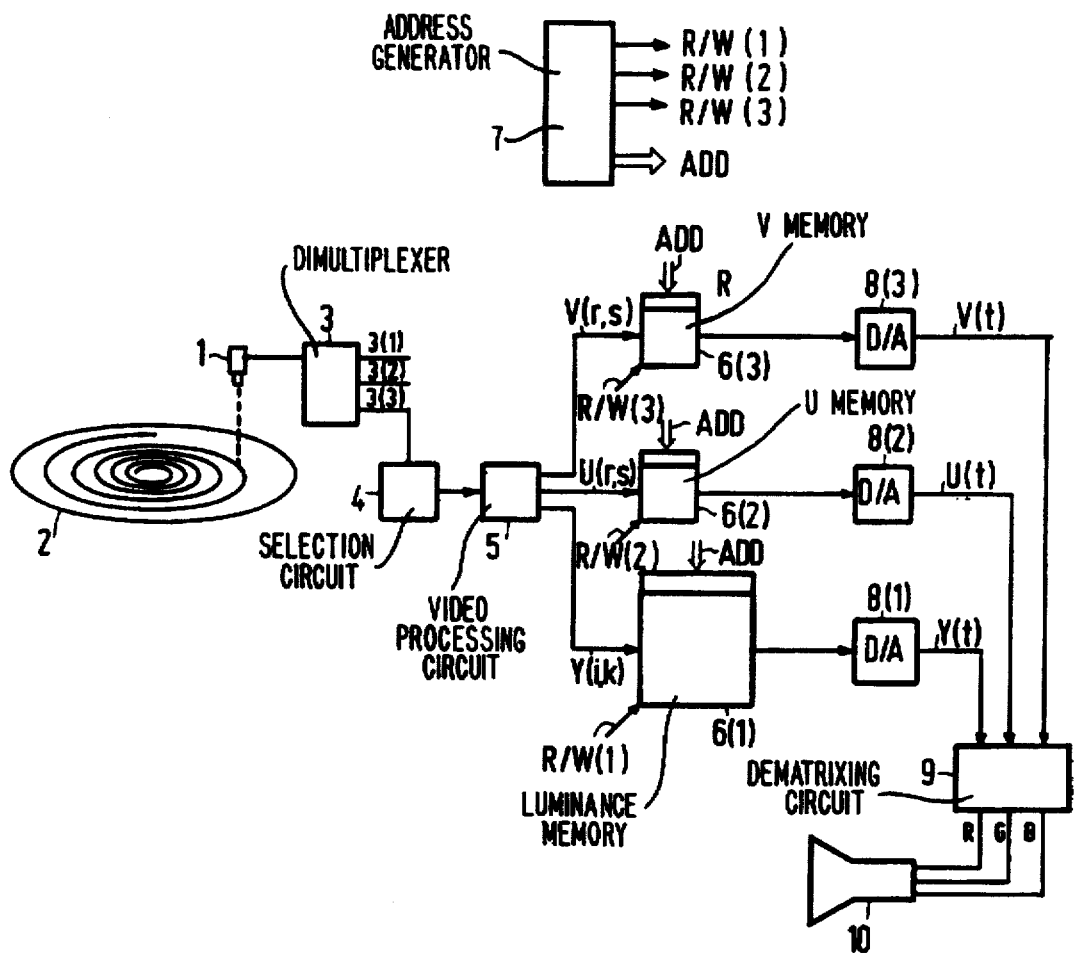
FIG. 8 shows a sequence in which the image data blocks with different packet headers can be transmitted.
FIG. 9 shows diagrammatically the structure of a display apparatus according to the invention.

FIG. 9 diagrammatically shows an embodiment of a display apparatus adapted to receive digitized images which are transmitted by means of a compact disc-like transmission medium in the format shown by way of example in FIG. 8. This display apparatus is provided with a read device 1 by means of which information recorded on a compact disc-like record carrier 2 can be read and converted into an electric signal which is applied to a demultiplexer 3. Starting from the information in the service field SF of a packet on the disc, this demultiplexer supplies the computer data packets at its output 3(1), the audio packets at its output 3(2) and the video packets at its output 3(3).

Since only the processing of the video packets plays a role within the scope of the present invention, the processing of the audio and computer data packets will not be further dealt with. The video packets are applied to a selection circuit 4 removing the packet headers from the video packets and selecting those blocks from the remaining image data blocks which are provided with predetermined packet headers, for example, only those image data blocks which are provided with the packet header $DS_1$, or both those image data blocks which are provided with the packet header $DS_1$ and those image data blocks which are provided with the packet header $DS_2$, etc. The image data blocks thus selected are applied to the video processing circuit 5 which supplies a luminance matrix Y(i,k) and the associated color difference matrices U(r,s) and V(r,s) for each image to be displayed. In the embodiment shown the luminance matrix Y(i,k) is stored in a luminance memory 6(1), the color difference matrix U(r,s) is stored in a U memory 6(2) and the color difference matrix V(r,s) is stored in a V memory 6(3). These memories 6(.) are addressed in the conventional manner by addresses ADD of an address generator 7 and by a read-write enable signal R/W(.). As soon as this signal has the logic value "1", information can be written in the relevant memory. If it has the logic value "0", the contents of the memory can be read. The information read from a memory 6(.) is converted in a D/A converter 8(.) into an analog signal. The analog luminance signal Y(t) thus obtained, as well as the two analog color difference signals U(t) and V(t) are converted into the elementary chrominance signals R, G and B in a dematrixing circuit 9 and applied to a display tube 10.

It will be evident that the more powerful the video processing circuit 5 is (and consequently the more costly), the more series of difference images can be selected by the selection circuit 4 (number of different packet headers) and thus the higher the temporal resolution will be.

Figure 4:
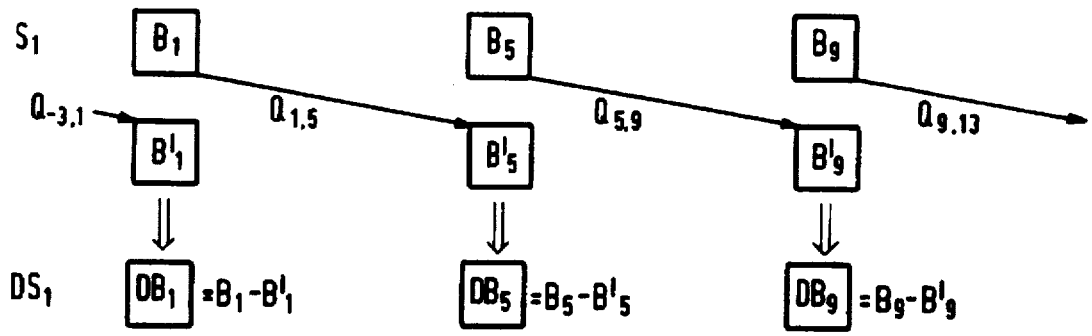
Figure 10:
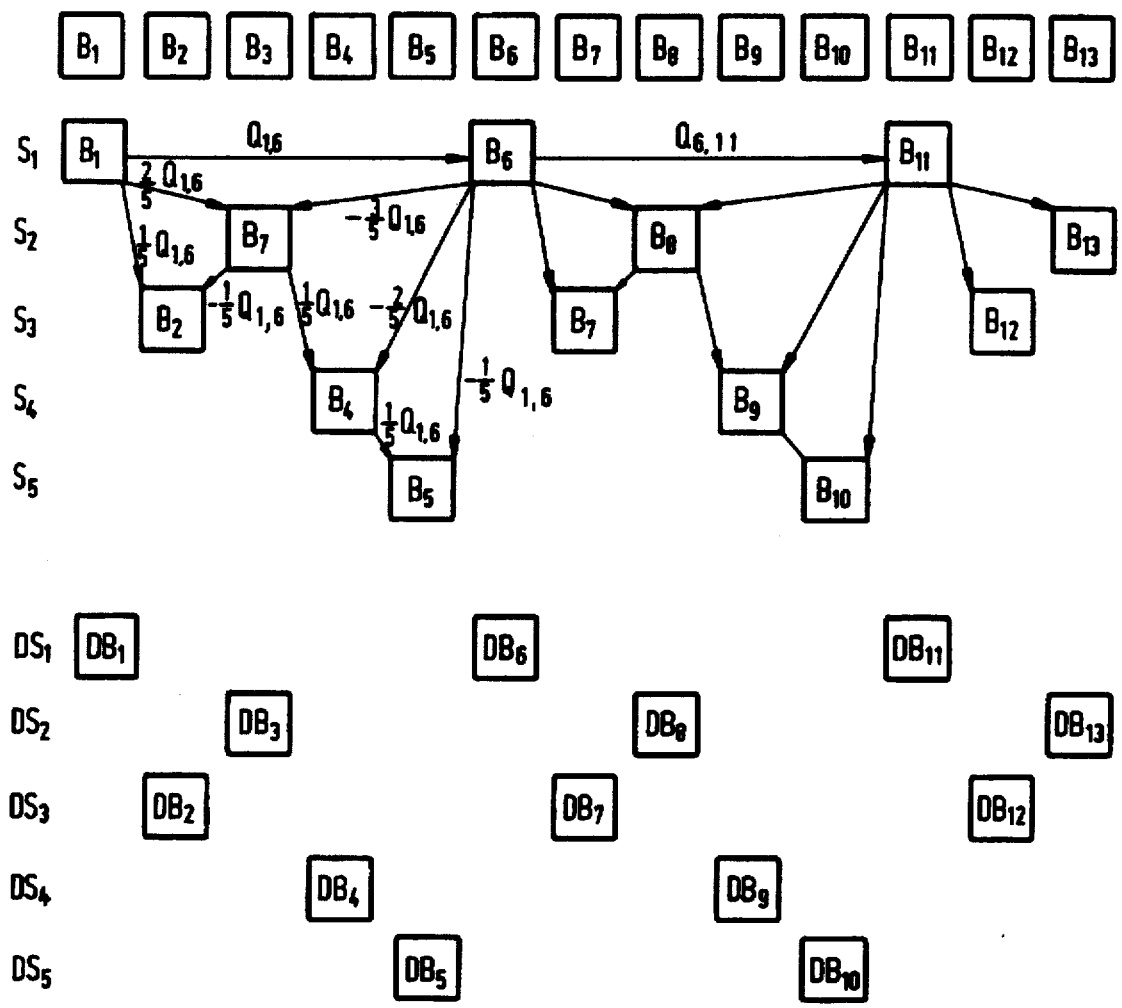
FIG. 10 shows diagrammatically another implementation of the hierarchic encoding process.

It has been tacitly assumed in FIG. 3 that the rate at which the images occur in the original series is equal to 50 Hz. However, the present invention obviates the ever recurrent problem related to the difference between the so-called 50 and 60 Hz field frequency countries. Let it be assumed that the images shown in FIG. 10 occur at a frequency of 60 Hz. This series can then be divided into five sub-series $S_1$, $S_2$, $S_3$, $S_4$, $S_5$. The images of the sub-series $S_1$ are converted in the manner as shown in FIG. 4 into the series $DS_1$ of difference images (system of motion vectors $Q_{1,6}$, $Q_{6,11}$, $Q_{11,16}$, ... ). The images of the sub-series $S_2$ are converted in the same way as is shown in FIG. 5 into the series $DS_2$ of difference images (system of motion vectors $\frac{2}{5}Q_{1,6}$, $-\frac{3}{5}Q_{1,6}$, ... ). The images of the sub-series $S_3$ are converted in the manner as shown in FIG. 6 into the series $DS_3$ of difference images (system of motion vectors $\frac{1}{5}Q_{1,6}$, $-\frac{4}{5}Q_{1,6}$, $\frac{1}{5}Q_{1,6}$, $\frac{1}{5}Q_{6,11}$, ... ). The images of the sub-series $S_4$ are converted in the manner as shown in FIG. 7 into the series $DB_4$ of difference images (system of motion vectors $\frac{1}{5}Q_{1,6}$, $-\frac{2}{5}Q_{1,6}$, $\frac{1}{5}Q_{1,6}$, $-\frac{2}{5}Q_{6,11}$, ... ). Finally the images of sub-series $S_5$ are converted into a series $DS_5$ of difference images in the manner as shown in FIG. 7 and starting from the images in the series $S_1$ and $S_4$. All this is shown diagrammatically in FIG. 10. More particularly, each arrow starts at an image by means of which a prediction image is calculated for the image where the arrow head of the relevant arrow ends, all this while taking the correct system of motion vectors into account. By selecting only the difference images of, for example the series $DS_1$, $DS_2$, $DS_3$ and $DS_4$ of the series of difference images thus obtained and by displaying them with mutually equal intervals, an image sequence of 50 Hz is obtained. By providing a display apparatus according to FIG. 9 with a selection circuit 4 and by ordering the video images on the disc and recording them in the manner as described above with reference to FIG. 10, the discs can be used in the so-called 50 Hz countries as well as in the so-called 60 Hz countries and the display apparatus can be simply made suitable for use in these different countries.

It is to be noted that it has been assumed in the foregoing that the motions in the image are linear. Consequently it is sufficient to calculate systems of "main" motion vectors for the images in the sub-series $S_i$. The motion vectors of the images in the other sub-series can then be obtained by taking a proportional part of these main motion vectors. However, it is alternatively possible to calculate the actual motion vectors for each image instead of taking the proportional part of the main motion vectors.

What is claimed is:

1. A method of encoding a video scene comprising a series of video images collectively depicting motion at a particular image rate, so as to allow decoding thereof not only at said particular image rate but alternatively also at one or more different lower image rates, comprising the steps of:

partitioning said series of video images into a plurality of interleaved subseries of video images, each said subseries comprising different ones of said video images and each said subseries having a rank order with respect to each other subseries, a first one of said subseries having a first rank order and a second one of said subseries having a second rank order, said video images of said subseries of said first rank order corresponding to a first image rate, and said video images of said subseries of said second rank order in combination with said video images of said subseries of said first rank order corresponding to a second image rate higher than said first image rate;

encoding each of said video images into a corresponding image data block, each video image in said first rank order subseries being encoded using only image information taken from video images which are in said first rank order subseries, and each video image in said second rank order subseries being encoded using only image information taken from video images which are either in said second rank order subseries or in said first rank order subseries; and tagging each image data block with the rank order of the subseries containing the video image encoded into said each image data block, whereby said image data blocks tagged with said first rank order are selectively decodable to reproduce said video scene at said first image rate and said image data blocks tagged with said second rank order in combination with said image data blocks tagged with first rank order are selectively decodable to reproduce said video scene at said second image rate.

2. The method of claim 1 comprising the additional step of storing said image data blocks on an optically readable disc.

3. A method of encoding a video scene as defined in claim 1 wherein:

said series of video images is partitioned in said partitioning step into at least three interleaved subseries of video images, a third one of said subseries having a third rank order and said video images of said subseries of said third rank order in combination with said video images of said subseries of said second rank order and of said subseries of said first rank order all together corresponding to a third image rate higher than said second image rate; and each video image in said third rank order subseries being encoded in said encoding step using only image information taken from video images which are in one of said first, second or third rank order subseries, whereby said image data blocks tagged with any one of said first, second or third rank order are selectively decodable to reproduce said video scene at said third image rate.

4. A method of encoding a video scene as defined in claim 3 wherein:

said series of video images is partitioned in said partitioning step into at least four interleaved subseries of video images, a fourth one of said subseries having a fourth rank order and said video images of said subseries of said fourth rank order and of said subseries of said third rank order and of said subseries of said second rank order and of said subseries of said first rank order all together corresponding to a fourth image rate higher than said third image rate; and each video image in said fourth rank order subseries being encoded in said encoding step using only image information taken from video images which are in one of said first, second, third or fourth rank order subseries, whereby said image data blocks tagged with any one of said first, second, third or fourth rank order are selectively decodable to reproduce said video scene at said fourth image rate.

5. A method of encoding a video scene comprising a series of video images collectively depicting motion at a particular image rate, comprising the steps of:

partitioning said series of video images into a plurality of interleaved subseries of video images, each said subseries comprising different ones of said video images and each said subseries having a rank order with respect to each other subseries, a first one of said subseries having a lowest rank order and further ones of said subseries having respectively higher rank orders;

encoding each of said video images into a corresponding image data block, each video image in said lowest rank order subseries being encoded using only image information taken from video images which are in said lowest rank order subseries, and with respect to each video image in at least one of said higher rank order subseries, encoding said higher rank order subseries video image by:

predicting said higher rank order subseries video image using only image information taken from video images which are in lower rank order subseries;

subtracting said predicted higher rank order subseries video image from said higher rank order subseries video image to produce a difference image; and encoding the produced difference image to form an image data block corresponding to said higher rank order subseries video image; and tagging each image data block with the rank order of the subseries containing the video image encoded into said image data block.

6. A method of encoding a video scene as defined in claim 5 wherein said higher rank order subseries video image is predicted in said predicting step by deriving motion vectors with respect to at least one video image which is in a lower rank order subseries and using said motion vectors and said at least one video image to predict said higher rank order subseries video image.

7. A method of encoding a video scene as defined in claim 6 wherein said higher rank order subseries video image is predicted in said predicting step by deriving motion vectors with respect to two video images which are both in lower rank order subseries and said motion vectors and said two video images are used to predict said higher rank order subseries video image, said higher rank order subseries video image preceding one of said two video images and following the other one of said two video images in said series of video images collectively depicting motion.

8. A method of encoding a video scene as defined in claim 7 wherein said higher rank order subseries video image and said one of said two video images are adjacent images in said series of video images collectively depicting motion.

9. A method of encoding a video scene as defined in claim 7 wherein said higher rank order subseries video image and said other one of said two video images are adjacent images in said series of video images collectively depicting motion.

* * * * *